July 9, 1968
F. FIXARI
3,391,768
WEAR ADJUSTOR FOR FRICTION DEVICES
Filed Oct. 12, 1966
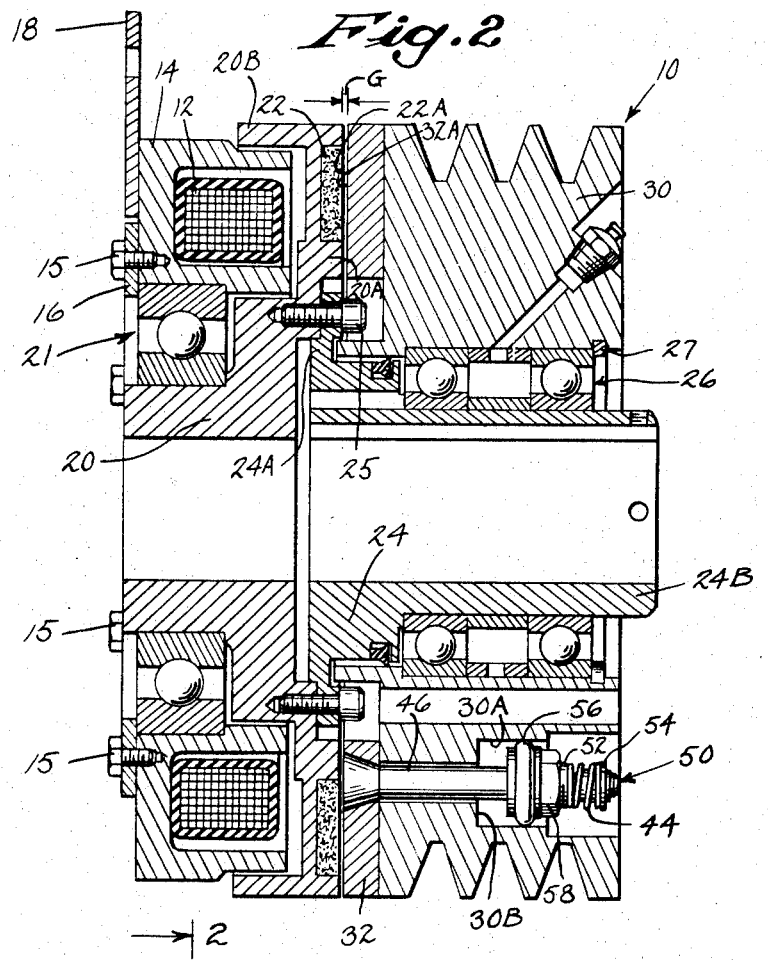
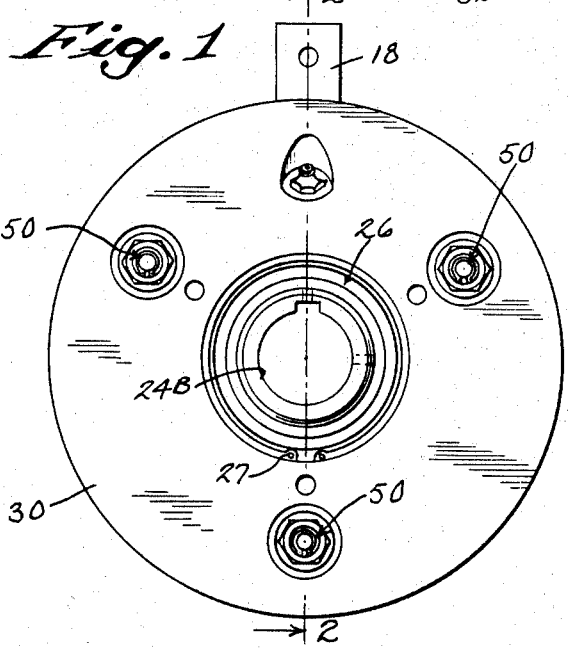
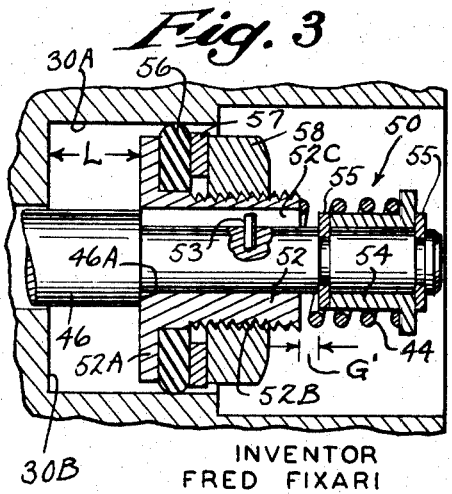
INVENTOR
FRED FIXARI
BY *Edward W. Mayer*
ATTORNEY

United States Patent Office 3,391,768
Patented July 9, 1968

3,391,768
WEAR ADJUSTOR FOR FRICTION DEVICES
Fred Fixari, Greendale, Wis., assignor to Rex Chainbelt Inc., Milwaukee, Wis., a corporation of Wisconsin
Filed Oct. 12, 1966, Ser. No. 586,249
9 Claims. (Cl. 192—111)

ABSTRACT OF THE DISCLOSURE

An automatic adjustment mechanism for compensating for wear of and maintaining a predetermined spacing between a pair of engageable friction surfaces of a friction device such as a clutch or brake. The adjustment mechanism includes a pin connected with one of the engageable surfaces, and a spring arranged to urge the pin in a direction tending to disengage the frictional surfaces. The spring connects to the engageable surface through a friction slip coupling providing limited securement of its parts. The pin is provided with abutment surfaces arranged to limit axial movement of the pin relative to the movable part of the coupling in either direction to a distance directly related to the predetermined space between the friction surface.

---

This invention relates generally to friction devices, and more particularly to a clutch or brake having provisions for automatic adjustment to compensate for the wearing down of frictional engaging surfaces.

Clutches and brakes of the friction type are used extensively for purposes of driving or stopping machinery. Be they mechanical or electromagnetic, the principle of operation is the same. The speed of two elements, initially rotating at different rates, is equalized by gradually engaging the elements, the energy required to effect the change in speed being dissipated as heat due to the increasing frictional engagement of the elements. The obvious and primary disadvantage of friction devices is that the friction surfaces are subject to high rates of wear. Although this problem persists in friction devices where the elements are merged into engagement by mechanical or hydraulic force, the problem is even more pronounced in electromechanical actuated devices where the initial space (commonly referred to as the air gap) between engageable friction surfaces is to a great extent, determinative of the force and speed with which the elements are merged into engagement.

In view of this problem, numerous devices have been proposed, and some have been used with marked success, for automatically adjusting the relative initial position of the engageable surfaces to thereby maintain the original initial spacing (or air gap) and thereby compensate for wear of the surfaces. The majority of the known devices involve the principal of uni-directional movement between a pair of elements, the movement usually being accompanied by a corresponding clamping or frictional engagement of the relatively moving parts to preclude movement in the opposite direction.

Because of the nature and application of friction devices, they are often subjected to extremely dirty environmental conditions; moreover, in some of the known devices the engaging member of the adjusting mechanism is progressively engaging an unclean surface so that reliability of the adjustment is impaired. A similar problem occurs where one of the engaging elements is subject to permanent deformation so that consistent operation cannot be obtained. Some known adjustment devices, although theoretically sound, are simply too delicate for the intended service. Likewise, some require highly skilled attendance in their initial setting up, or must be pre-set in situ which involves considerable expense and time. In some known devices, the operation of the adjusting mechanism is tied in with the functioning of return springs (used to return the engaging elements of the friction device to their original relative position upon the termination of the engaging force) in such a fashion that the sensitivity and stability of the adjustment is dependent upon the extent of deformation of the spring, and accordingly variations in the adjustment occur over the range of the adjustment mechanism. Still another common fault of known adjusting devices is that they allow unlimited adjustment, so that they are capable of being operated to a condition of virtual self-destruction unless close attention is paid to their condition of wear at all times.

It is accordingly an object of the present invention to provide a friction device having an improved automatic adjustment mechanism that compensates for the wearing down of the frictional engaging surfaces of the device. More specific objects of the present invention in relation to such devices are: to provide an automatic adjustment mechanism the operation of which is unaffected by unclean environmental conditions; to provide an automatic adjustment mechanism that is of rugged, simple construction and may be pre-adjusted to a desired degree of sensitivity prior to insertion into the device; to provide an automatic adjustment mechanism, the operation of which is unaffected by changes in the absolute position of, and the sensitivity of which remains constant over, its entire operating range; and to provide an automatic adjustment mechanism having a finite adjustment limit so that the device is not operable under wear conditions that would damage otherwise permanent portions or elements of the device.

To attain these and other objects, there is provided, according to the present invention a friction device comprising a pair of members having respective surfaces spaced apart a pre-set distance, at least one of the surfaces being mounted for rotation. Means, such as an electromagnet, are provided for effecting relative movement of the surfaces in a direction toward and into frictional engagement with each other. A return spring is provided for returning the surfaces to their initial relative position when the engaging force is discontinued. An automatic adjustment device is mounted on one of the members to compensate for wearing down of the engaging surfaces and thereby maintain the pre-set distance. The adjustment means includes a pin connected for movement with the adjustable wear surface, and a friction coupling having a pair of engaged elements, the first of which is fixed relative to the member on which the adjustment device is mounted, and the second of which is limitedly secured (as by frictional engagement) against movement with respect to the first. The return spring is connected between the second element and the pin so as to urge the pin in a direction causing disengagement of the engageable surfaces. A pair of abutments are arranged on the pin so as to limit axial movement of the pin relative to the second element in either direction to a distance substantially equal to the aforementioned preset distance. The frictional engagement between the elements of the friction coupling is such that it is overcome by the force exerted by the engaging mechanism (e.g., electromagnet), but is not overcome by the force exerted by the return spring.

These and other objects and advantages will appear in the following detailed description of the invention having reference to the accompanying drawings in which:

FIGURE 1 is a partial front view of a friction device according to the present invention;

FIG. 2 is a sectional view in larger scale taken along lines 2—2 of FIG. 1; and

FIG. 3 is an enlarged view of a portion of FIG. 2.

The invention, as shown in the drawings and as described in detail hereinafter, is disclosed as being embodied in an electromagnetic actuated clutch. It will, however, be appreciated that the invention is intended for application in all friction devices (e.g., clutches and brakes) actuated by any means (e.g., electromagnetic, mechanical and hydraulic).

Referring specifically to the drawings, there is depicted an electromagnetic actuated clutch assembly 10 comprising an annular energizable magnet coil 12 housed within an annular magnet body 14 of C-shaped cross-section, the coil 12 being connected with a source of electric current (not shown). The body 14 is suitably connected, as by welding, to a restraining strap 18, which in turn is connected to a stationary frame member (not shown). From this description it will be appreciated that the coil 12 is fixed with respect to the stationary frame.

A rotor 20 is journaled for rotation with respect to the inner annular surface of the body 14 by means of ball-bearing assembly 21, the assembly being held in position by means of retaining ring 16 which is fastened to the body 14 by bolts 15. The rotor includes an outwardly extending circular plate portion 20A having formed on its outer periphery an annular cylindrical flange portion 20B, one end of which encloses a portion of the body 14. The side of the plate portion 20A that faces away from the coil 12 is formed with an annular recess of rectangular cross-section in which is suitably fastened a friction ring 22 formed of a suitable material and having an exposed annular wear surface 22A facing away from the coil 12 and body 14.

A rotor extension 24, having an outwardly extending flange plate 24A, is connected for rotation with the rotor 20 by means of bolts 25. The extension 24 is formed with an axial sleeve portion 24B having a bore arranged to receive the shaft of a drive motor (not shown). The outside of the sleeve portion 24B is fitted with a ball bearing assembly 26, on which is journaled a sheave 30 formed with notches shaped for reception of multiple V-belts (not shown) which connect with the machinery to be driven by the clutch assembly 10. The ball bearing assembly 26 is restrained from outward movement by a snap ring 27 which fits within an annular groove in the sheave 30. An annular ferromagnetic friction plate 32 (which also serves as an armature), is mounted on the sheave 30 on its inner side by drive pins 46, the plate 32 having a wear surface 32A on its side facing and spaced from the adjacent wear surface 22A a predetermined distance indicated on FIG. 1 by the reference letter G and commonly referred to as the air gap.

The outboard side of the sheave 30 is formed with a plurality (three in the embodiment shown) of cylindrical recesses 30A, in each of which is disposed a compressed return spring 44. Each spring 44 is connected to exert a force on an associated drive pin 46 that is connected for movement with the friction plate 32, the springs 44 being arranged to constantly urge the pins 46 and plate 32 away from the adjacent surface 22A. An automatic adjusting mechanism 50, the details of which will be discussed hereinafter, is also disposed within each recess 30A and is operatively associated with the corresponding drive pin 46 and return spring 44.

Assuming the sleeve portion 24B to be connected with the shaft of a rotating drive motor and the sheave 30 to be appropriately loaded by virtue of its connection with the machinery to be driven, the operation of the clutch assembly 10 is as follows. When the clutch 10 is in the disengaged state, the rotor 20 rotates with the rotor extension 24 by virtue of the connection by bolts 25. The coil 12 and body 14 are fixedly mounted, and the sheaves 30 does not rotate because of its being mounted through ball bearing assembly 26. The initial relative position of the friction ring 22 and friction plate 32 is such that the wear surface 22A and 32A are spaced apart by the air gap G. When it is desired to commence rotation of the sheave 30, the coil 12 is energized to produce a magnetic field, the force of which attracts the friction plate (armature) 32 toward and into frictional engagement with the friction ring 22, the force of attraction being sufficient to overcome the composite force exerted by the return springs 44. As the wear surfaces 22A and 32A are urged together, the sheave 30, being connected by drive pins 46 with plate 32, will begin to rotate and will eventually attain the speed of the rotor 20. In order to disengage the clutch assembly 10 and thereby discontinue driving sheave 30, the magnetic attraction of the friction plate 32 is terminated by shutting off the current flow to the coil 12, thereby allowing the friction plate 32 to return to its original position under the influence of the return springs 44.

It will be appreciated that, upon repeated engagement and disengagement of the clutch assembly 10, the surfaces 22A and/or 32A progressively wear down to an appreciable extent, and that the air space G would progressively increase by the aggregate amount of the wear on the surfaces 22A and 32A. An appreciable increase in the air gap G would greatly affect the operation of the clutch assembly 10 since it would alter the initial force exerted on the armature 32 and could therefore make clutch operation impossible or at least sluggish.

To avoid the above described deleterious effects of having the air space G widen upon wear of the engaging surfaces 22A and 32A, there are provided a plurality (three as shown in FIG. 1) of co-acting adjusting mechanisms 50 equally spaced about and connected to the outboard side of the sheave 30. As best shown in FIG. 3, each adjusting mechanism 50 is arranged partially within one of the cylindrical recesses 30A formed in the side of the sheave 30 and having a bottom shoulder 30B, and is operatively associated with a corresponding drive pin 46 and return spring 44. The drive pin 46 is formed with a shoulder 46A, against which abuts a sleeve 52 having an enlarged flange portion 52A on its inner end and external threads 52B on its outer end. The sleeve 52 is also formed with an axial bore through which the pin 46 passes, and a longitudinally extending slot 52C in which a holding pin 53, connected with the drive pin 46, is received upon assembly of the mechanism 50. A spring retainer 54, having an enlarged flange portion on its outer end, is mounted on the outer end of the drive pin 46 and is restrained from axial movement by a pair of retaining rings 55. The return spring 44 is assembled in compression so that its ends bear against the outer end of the sleeve 52 and the inner side of the flange portion, thus constantly urging the drive pin 46 and connected friction plate 32 away from and out of engagement with ring 22.

An annular friction member (such as a rubber grommet) 56 is mounted to abut with the outer face of the flange portion 52A of the sleeve 52, the friction member 56 being held in place and compressed by a compression washer 57 and nut 58 which engages the threads 52B. The friction member is sized so that it is compressible (by the washer 57 and nut 58) to the extent that it will be frictionally engaged (and therefore limitedly secured against movement) with the cylindrical wall of the recess 30A.

In relation to the above description, and referring particularly to FIG. 3, note should be taken of the distance G' between the outer end of the sleeve 52 and the inner face of the innermost retaining ring 55, and also of the distance L between the bottom shoulder 30B of the recess 30A and the innermost face of the sleeve 52. The distance G' is established by the proper sizing and assembly of parts as being substantially equal to the preset air gap G. The distance L is similarly established as the desired amount of (or at most, the maximum tolerable) wear of the friction surfaces 32A and 22A before replacement is necessary. By way of example and not limitation, the air gap G (and the distance G') might be about 0.02 inch and the distance L might be about ¼ inch.

In assembling the mechanism 50, the sleeve 52, friction member 56, washer 57 and nut 58 may be pre-assembled before being mounted on the drive pin 46. It will be appreciated that tightening of the nut 58 on the threads 52B will effect enlargement of the outer periphery of the friction member 56 and therefore a limitedly secured engagement between the friction member 56 and the wall of the recess 30A. It is necessary for the proper operation of the adjusting mechanism 50 that the force of the frictional engagement between friction member 56 and wall 30A be such that it is overcome by the force exerted by the magnetic coil 12 on the plate 32; but is not overcome by the composite force exerted by the return springs 44. Assembly of the mechanism 50 is completed by mounting the inner retainer ring 55, spring 44, spring retainer 54 and outer retainer ring 55 on the drive pin 46 in that order.

In the operation of the clutch assembly 10, the functioning of each adjusting mechanism 50 is as follows. Assuming the proper initial adjustments and no wear on the surfaces 22A and 32A, when the coil 12 is energized, the plate 32 is moved to close the air gap G, this movement also causing axial movement of the drive pin 46 a corresponding distance, compression of the spring 44, and closure of the distance G′, so that the inner retainer ring 55 just touches the outer end of sleeve 52. There is no movement of the sleeve 52 or friction member 56 relative to the wall of the recess 30A since the frictional engagement therebetween is such as not to be overcome by the force of the spring 44. Upon de-energization of the coil 12, the plate 32 and pin 46 return to their initial positions under the influence of spring 44, there again being no movement of the friction member 56 relative to the wall of the recess 30A. As the surfaces 22A and 32A wear down any appreciable amount, on each successive engagement of the clutch assembly 10, the mechanisms 50 will adjust the return position of the plate 32 to maintain the air gap G. Each time the inner retainer ring 55 engages the outer end of the sleeve 52, since the force exerted by the coil 12 is sufficient to overcome the frictional engagement between the friction member 56 and the wall of the recess 30A, the sleeve 52 and friction member 56 move a distance along the wall of the recess 30A equal to the amount of wear of the surfaces 22A and 32A. Upon de-energization of the clutch and retraction of the plate 32 under the influence of springs 44, the pin shoulder 46A engages the sleeve 52, but is unable to move it to its original position. It will be appreciated that upon the automatic adjustment of the clutch, that the plate 32 is spaced apart from the sheave 30 by the amount of the adjustment upon return to the inoperative position. Thus it can be seen that the adjustment occurs automatically on each successive energization of the clutch to whatever degree is necessary to maintain the pre-determined air gap G, the effect of each adjustment being to diminish the distance L.

It should be particularly noted that the friction member 56 always moves in one direction (to the left in FIGS. 2 and 3) relative to the wall of the recess 30A. Thus, friction member 56 forms its own dirt seal, and always moves toward and over a clean surface. It should also be noted that the degree of compression of the spring 44 is in no way dependent on the degree of adjustment that has occurred, so that the resistance to movement of the plate 32 and the return force applied is always the same.

The degree of adjustment of the clutch assembly 10 is limited by the distance L. When adjustment has been accomplished to the extent that the inner end of the sleeve 52 abuts the recess bottom 30B, no further adjustment can occur. This feature of the present invention prevents operation of the clutch assembly 10 under wear conditions that would cause serious damage to parts that normally do not require replacement. The distance L is initially established as the maximum tolerable wear condition. When this condition is reached, engagement of the surfaces 22A and 32A is no longer possible, and inoperativeness of the clutch assembly 10 will be adequate notice that replacement of the wear parts is necessary.

From the above description, it can be seen that the critical aspects of the adjusting mechanism 50 relate to their manufactured dimensions. For example, the initial distances L and G′ are functions solely of the relative dimensions of parts. Thus, it will be appreciated that a relatively unskilled person would be capable of assembling and initially adjusting the mechanism 50.

The foregoing description of the invention and of the manner and process of making and using it sets forth the best mode or modes of carrying out the invention as presently contemplated. The following claims particularly point out and distinctly claim the subject matter which is regarded as the invention.

What is claimed is:

1. A friction device comprising a pair of members having respective surfaces spaced apart a pre-set distance, at least one of said surfaces being mounted for rotation, first means for applying force to effect relative movement of said surfaces in a direction toward each other and thereby cause frictional engagement of said surfaces, second means including a spring for applying force to return said surfaces to their initial relative position upon the termination of force application by said first means, and means mounted on one of said members for automatically adjusting the position of its surface to compensate for wearing down of said surfaces and thereby maintain said pre-set distance, said last named means including a pin connected for movement with said surface, coupling means having a pair of engaged elements, the first of which is fixed relative to said one member and the second of which is limitedly secured against movement with respect to said first element, said spring being connected between said second element and said pin so as to urge said pin in a direction opposite the first named direction, and stop means including cooperating pairs of positively engaging abutments on said pin and second element operative to limit axial movement of said pin relative to said second element in either direction to a distance directly related to said pre-set distance, the engagement of said elements being such that it is overcome by the exertion of said first force applying means, but is not overcome by the exertion of said second force applying means.

2. The invention according to claim 1 wherein said one member is mounted for rotation, and said pin is in torque transmitting relation with said one member.

3. The invention according to claim 2 wherein said first means for applying force includes an electromagnet having a coil, and said pre-set distance is an air gap.

4. The invention according to claim 1 wherein said second element includes a sleeve mounted on said pin for axial movement relative thereto, one pair of abutments is on said sleeve, and another pair of abutments is on said pin, the second named pair of abutments being spaced about a distance substantially equal to the distance between the first named pair of abutments on said sleeve plus said pre-set distance.

5. The invention according to claim 4 wherein said one member is formed with a recess, said pin extends through said recess, and said second element is disposed within said recess.

6. The invention according to claim 5 wherein the engagement between said first and second elements is frictional engagement, and one of said elements includes a relatively soft resilient friction member.

7. The invention according to claim 6 wherein said recess is formed with a cylindrical inner wall said second element includes said friction member, and said friction member has an annular outer surface and is secured to said sleeve.

8. The invention according to claim 5 wherein said recess has a bottom abutment surface, and said sleeve is initially spaced a predetermined distance from said bottom surface, said predetermined distance being the maximum desired extent of adjustment.

9. The invention according to claim 4 wherein said first means for applying force includes an electromagnet having a coil, and said pre-set distance is an air gap.

References Cited

UNITED STATES PATENTS

| | | |
|---|---|---|
| 2,568,858 | 9/1951 | Kovac. |
| 2,644,549 | 7/1953 | Cagle. |
| 2,905,277 | 9/1959 | Cagle. |
| 3,297,122 | 1/1967 | Simonson. |

BENJAMIN W. WYCHE III, *Primary Examiner.*